United States Patent
Choi

(10) Patent No.: US 9,136,730 B2
(45) Date of Patent: Sep. 15, 2015

(54) ENERGY STORAGE SYSTEM

(75) Inventor: Jongki Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1352 days.

(21) Appl. No.: 12/908,825

(22) Filed: Oct. 20, 2010

(65) Prior Publication Data

US 2011/0140527 A1 Jun. 16, 2011

(30) Foreign Application Priority Data

Dec. 15, 2009 (KR) ........................ 10-2009-0124632

(51) Int. Cl.
*H02J 1/00* (2006.01)
*H02J 7/35* (2006.01)
*H02J 3/38* (2006.01)

(52) U.S. Cl.
CPC .. *H02J 7/35* (2013.01); *H02J 3/385* (2013.01); *Y02E 10/58* (2013.01); *Y10T 307/68* (2015.04)

(58) Field of Classification Search
CPC ........... H02J 3/382; H02J 3/383; H02J 3/385; H02J 2009/068; H02J 1/108
USPC .................................... 307/64, 66, 74, 75, 80
See application file for complete search history.

(56) References Cited

U.S. PATENT DOCUMENTS

| | | | | |
|---|---|---|---|---|
| 6,311,279 | B1 * | 10/2001 | Nguyen | 713/300 |
| 6,738,244 | B1 * | 5/2004 | Lepley | 361/78 |
| 7,145,265 | B2 * | 12/2006 | Mc Nulty et al. | 307/44 |
| 2008/0315828 | A1 | 12/2008 | Lu et al. | |
| 2008/0316774 | A1 | 12/2008 | Ito et al. | |

FOREIGN PATENT DOCUMENTS

| | | |
|---|---|---|
| JP | 2002-116830 | 4/2002 |
| JP | 2008-092648 | 4/2008 |
| JP | 2008-312395 | 12/2008 |
| KR | 1998-081918 A | 11/1998 |
| KR | 10-2008-0001828 | 1/2008 |
| KR | 10-2008-0092952 | 10/2008 |

OTHER PUBLICATIONS

"Photovoltaic UPS", Jayasima and Kumar, Tencon 2003, pp. 1419-1423, from IEEE, with attached IEEE abstract material to show the date.*
English Machine Translation of Japanese Publication 2008-092648, 14 pages.
Korean Notice of Allowance dated Sep. 29, 2011 issued to corresponding application No. 10-2009-0124632, 5 pages.
Patent Abstracts of Japan and English Machine Translation of Japanese Publication No. 2002-116830 23 pages.

* cited by examiner

*Primary Examiner* — Fritz M Fleming
(74) *Attorney, Agent, or Firm* — Christie, Parker & Hale, LLP

(57) ABSTRACT

An energy storage system includes: a new renewable energy unit generating a new renewable energy power; a DC link connected to the new renewable energy unit and generating a DC link power; a power system connected to the DC link and generating a power system power; a battery connected to the DC link and generating a battery power; an auxiliary power generator connected to the power system, the new renewable energy unit, the DC link, and the battery, respectively, and generating an auxiliary power; and an integrated controller connected to the auxiliary power generator and receiving the auxiliary power. The auxiliary power is selected from one of the power system power, the new renewable energy power, the DC link power, and the battery power.

14 Claims, 2 Drawing Sheets

ENERGY STORAGE SYSTEM

CROSS-REFERENCE TO RELATED APPLICATION

This application claims the benefit of Korean Patent Application No. 10-2009-0124632 filed on Dec. 15, 2009, in the Korean Intellectual Property Office, the disclosure of which is incorporated herein by reference.

BACKGROUND

1. Field

Example embodiments relate to an energy storage system.

2. Description of the Related Art

Recently, developed is an energy storage system in which a solar battery and a power system are linked to each other to supply power to various kinds of loads and surplus power is stored in a secondary battery, after supplying the power to the various kinds of loads. This energy storage system can supply the power stored in the secondary battery to various loads even if the solar battery and the power system are shut down.

In addition, the energy storage system includes a controller that controls power flow between the solar battery, the power system, the secondary battery, and the various loads. This controller requires power and uses one of the solar battery, the power system, and the secondary battery as the power. However, if a problem occurs in the power supply of the power, the controller does not operate smoothly and as a result, the energy storage system cannot continuously maintain normal operations.

SUMMARY

Embodiments are directed to an energy storage system, which substantially overcomes one and/or more of the problems due to the limitations and disadvantages of the related art.

It is therefore a feature of an embodiment to provide an energy storage system capable of maintaining a stable operation by an auxiliary power generated from an auxiliary power generator and reducing costs for a storage battery that is additionally required for generating an auxiliary power.

At least one of the above and/or other features and advantages may be realized by providing an energy storage system, including a new renewable energy unit generating a new renewable energy power; a Direct Current (DC) link connected to the new renewable energy unit generating a DC link power; a power system connected to the DC link and generating a power system power; a battery connected to the DC link and generating a battery power; an auxiliary power generator connected to the power system, the new renewable energy unit, the DC link, and battery, respectively, and generating an auxiliary power; and an integrated controller connected to the auxiliary power generator and receiving the auxiliary power, wherein the auxiliary power is one of the power system power, the new renewable energy power, the DC link power, and the battery power.

The auxiliary power may be one of the power system power, the new renewable energy power, the DC link power, and the battery power, having a highest power level.

The DC link power may be generated by storing at least one of the power system power, the new renewable energy power, and the battery power.

According to another embodiment, the auxiliary power generator may operate when the energy storage system begins to operate.

The auxiliary power may be one having the highest power among the power system power, the new renewable energy power, and the battery power.

The auxiliary power may be the DC link power when the energy storage system normally operates after a predetermined time has elapsed.

According to another embodiment, the auxiliary power generator may operate when a problem occurs in the generation of at least one of the power system power, the new renewable energy power, the DC link power, and the battery power.

The auxiliary power may be one selected from the power system power, the new renewable energy power, the DC link power, and the battery power.

The auxiliary power generator may include: an AC-DC converter inverting the power system power into a DC power; and a diode OR circuit unit including a first diode to which the inverted power system power is applied, a second diode to which the new renewable energy power is applied, a third diode to which the DC link power is applied, and a fourth diode to which the battery power is applied, wherein the diode OR circuit unit outputs a power having a highest level among the inverted power system power, the new renewable energy power, the DC link power, and the battery power, as the auxiliary power.

According to another embodiment, the auxiliary power generator may further include a capacitor, the capacitor being connected between the diode OR circuit unit and the integrated controller and removing noise or ripple from the auxiliary power outputted from the diode OR circuit unit.

The auxiliary power generator may further include an auxiliary power converter, the auxiliary power converter being connected between the diode OR circuit unit and the integrated controller and converting the auxiliary power outputted from the diode OR circuit unit.

The energy storage system may further include: a bi-directional inverter connected between the DC link and the power system; a load connected between the bi-directional inverter and the power system; and a bi-directional converter connected to the DC link and the battery.

According to another embodiment, the energy storage system may further include: a maximum power point tracker connected between the new renewable energy unit and the DC link; a system linker connected between the bi-directional inverter, the load, and the power system; and a Battery Management System (BMS) connected to the battery.

The integrated controller may control and monitor the maximum power point tracker, the bi-directional inverter, the system linker, and the BMS.

According to another embodiment, the new renewable energy unit may be a solar battery.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages will become more apparent to those of ordinary skill in the art by describing in detail exemplary embodiments with reference to the attached drawings, in which.

DETAILED DESCRIPTION

Figure 1:
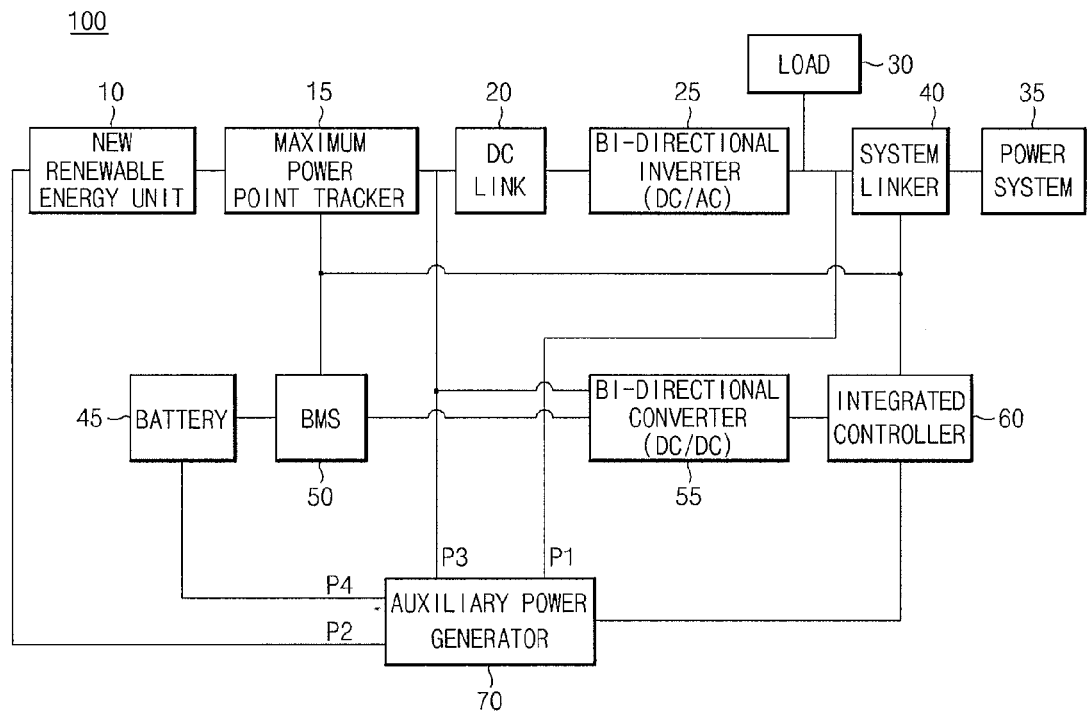
FIG. 1 illustrates a block diagram of an energy storage system according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
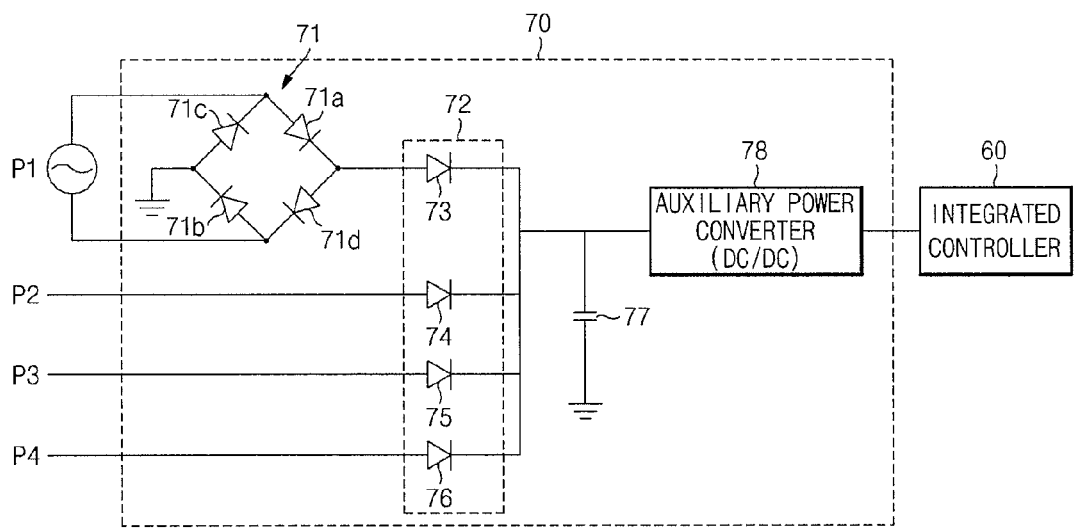
FIG. 2 illustrates a circuit diagram of an auxiliary power generator of FIG. 1.

FIG. 1 illustrates a block diagram of an energy storage system according to one embodiment of the present invention. FIG. 2 illustrates a circuit diagram of an auxiliary power generator of FIG. 1.

Referring to FIGS. 1 and 2, the energy storage system 100 includes a new renewable energy unit 10, a maximum power point tracker 15, a Direct Current (DC) link 20, a bi-directional inverter (DC/AC) 25, a load 30, a power system 35, a system linker 40, a battery 45, a Battery Management System (BMS) 50, a bi-directional converter (DC/DC) 55, an integrated controller 60, and an auxiliary power generator 70.

The new renewable energy unit 10 may include a solar battery, a wind power plant, a tidal plant or a geothermal power plant or any combination thereof. The new renewable energy unit 10 generates electric power from natural sources such as solar heat, solar light, wind, tidal energy, and the heat from the earth. In embodiments of the present invention, the new renewable energy unit 10 includes a solar battery.

The maximum power point tracker 15 is connected to the new renewable energy unit 10, extracts the maximum power by tracking the maximum power point of the new renewable energy unit 10, and outputs a new renewable energy power by converting the extracted maximum power into a DC power. For this, the maximum power point tracker 15 includes a maximum power point tracking controller including an algorithm that tracks the maximum power point of the new renewable energy unit 10 according to changes such as solar radiation and temperature and a boosting DC/DC converter for converting the maximum power of the new renewable energy unit 10 into a DC power. Here, the maximum power of the new renewable energy unit 10 may be a DC power.

The DC link 20 is connected to the maximum power point tracker 15 and stores a new renewable energy power supplied from the maximum power point tracker 15 as a DC link power. For this, the DC link 20 may include a capacitor. However, it is understood that any other element that stores power may be used as the DC link 20.

The bi-directional inverter 25 is connected to the DC link 20 and inverts the new renewable energy power stored in the DC link 20 as a DC link power into an AC power.

The load 30 is connected to the bi-directional inverter 25 and receives the new renewable energy power through the bi-directional inverter 25. The load 30 may be a home or an industrial facility that uses an AC power.

The power system 35 is an electrical link over a broad area including a power plant, a transformer substation, and a power-transmission line, and provides a power system power. Here, the power system power may be an AC power. The power system 35 is connected to the bi-directional inverter 25 and the load 30, and receives the new renewable energy power through the bi-directional inverter 25, or supplies the power system power into the load 30.

The system linker 40 is connected between the bi-directional inverter 25, the load 30, and the power system 35, and controls the connection and disconnection of the power system 35. For example, if there is an interruption of electric power in the power system 35, the system linker 40 separates the power system 35 from the bi-directional inverter 25 and the load 30, in order to allow an operator to solve a breakdown of the power system 35 in a stable environment. Moreover, if the breakdown of the power system 35 is solved, the system link 40 connects the power system 35 with the bi-directional inverter 25 and the load 30 again.

The battery 45 is connected to the new renewable energy unit 10 and the power system 35, and supplies a battery power. Here, the battery power may be a DC power. The battery 45 may be a secondary battery that can be charged and discharged, and may include a plurality of battery cells of a small capacity or one battery cell of a large capacity to provide a large power.

The BMS 50 is connected to the battery 45 and maintains and manages a state of the battery 45. In more detail, the BMS 50 monitors voltage, current, and temperature of the battery 45 to achieve the battery's safety and checks a State Of Charge (SOC), a State Of Health (SOH), battery cell balancing, and a cooling state of the battery in order to control charge and discharge of the battery 45.

The bi-directional converter 55 is connected between the new renewable energy unit 10, the power system 35, and the battery 45, in more detail, between the maximum power point tracker 15, the DC link 20, and BMS 50. The bi-directional converter 55 converts a new renewable energy power (stored in the DC link 20 as a DC link power) or a power system power (that is inverted into a DC power by the bi-directional inverter 25 and stored in the DC link 20 as a DC link power) into a DC power and supplies this DC power to the battery 45. Additionally, the bi-directional converter 55 converts a battery power into a DC power and then provides this DC power to the DC link 20 as a DC link power.

The integrated controller 60 monitors and controls the maximum power point tracker 15, the bi-directional inverter 25, the system linker 40, the BMS 50, and the bi-directional converter 55 all together.

The auxiliary power generator 70 is connected to each of the power system 35, the new renewable energy unit 10, the DC link 20, and the battery 45, and in particular, the auxiliary power generator 70 is connected to the power system 35 through the system linker 40. The auxiliary power generator 70 selects one of a power system power P1, a new renewable energy power P2, a DC link power P3, and a battery power P4 (which are supplied from the power system 35, the new renewable energy unit 10, the DC link 20, and the battery 45, respectively) and then generates an auxiliary power. The auxiliary power generator 70 supplies an auxiliary power to the integrated controller 60 and uses the auxiliary power as a driving voltage of the integrated controller 80. Here, the auxiliary power generator 70 selects the highest power from the power system power P1, the new renewable energy power P2, the DC link power P3, and the battery power P4, which are supplied from the power system 35, the new renewable energy unit 10, the DC link 20, and the battery 45, respectively. For this, the auxiliary power generator 70 may include an AC-DC converter 71, a diode OR circuit unit 72, a capacitor 77, and an auxiliary power converter 78 as shown in FIG. 2.

The AC-DC converter 71 is connected to the power system 35 through the system linker 40 and inverts the power system voltage P1 supplied as an AC power into a DC power. The AC-DC converter 71 may include full bridge diodes 71a, 71b, 71c, and 71d. Here, since the AC-DC converter 71 may be all kinds of circuits for converting an AC power into a DC power, an embodiment of the present invention does not limit the AC-DC converter 71 with the full bridge diodes 71*a*, 71*b*, 71*c*, and 71*d*.

The diode OR circuit unit 72 includes a plurality of diodes 73, 74, 75, and 76, which are connected in parallel. The diodes 73, 74, 75, and 76 include a first diode 73 to which the inverted power system power P1 is applied, a second diode 74 to which the new renewable energy power P2 is applied, a third diode 75 to which the DC link power D3 is applied, and a fourth diode 76 to which the battery power P4 is applied. This diode OR circuit unit 72 substantially selects the highest power from the power system power P1, the new renewable energy power P2, the DC link power P3, and the battery power P4, which are supplied from the power system 35, the new renewable energy unit 10, the DC link 20, and the battery 45, respectively, and then generates and outputs an auxiliary power.

The capacitor 77 is connected to the diode OR circuit unit 72, and removes noise or ripple from the auxiliary power outputted from the diode OR circuit unit 72 to stabilize the auxiliary power.

The auxiliary power converter 78 is connected to the capacitor 77, converts the auxiliary power outputted from the diode OR circuit unit 72 into a DC power, and then supplies the DC power to the integrated controller 60.

Next, operations of the auxiliary voltage generator will be described in more detail.

Figure 3:
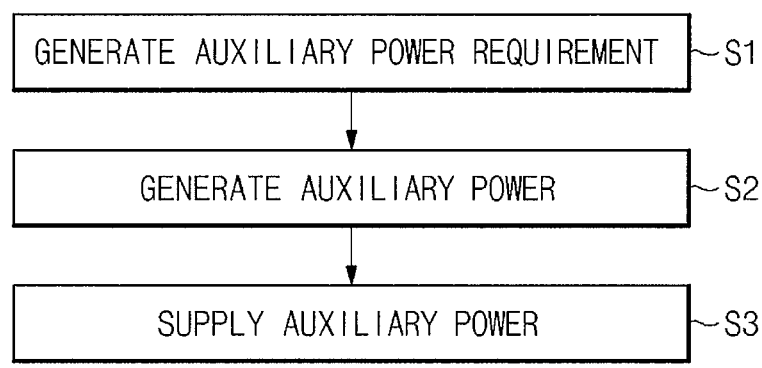
FIG. 3 illustrates a flowchart of an operation of the auxiliary power generator shown in FIG. 1.

FIG. 3 illustrates a flowchart of operations of the auxiliary power generator shown in FIG. 1. Referring to FIG. 3, the auxiliary power requirements for driving the integrated controller 60 are generated in an auxiliary power requirements generating operation S1. For example, the auxiliary power requirements occur when the energy storage system 100 starts, or power supply problems occur in one or two of the power system power P1, the new renewable energy power P2, the DC link power P3, and the battery power P4. Here, the power supply problem of the power system power P1 may occur when an electric power is interrupted in the power system 35. The power supply problem of the new renewable energy power P2 may occur when the new renewable energy unit 10 cannot generate a power. The power supply problem of the DC link power P3 may occur when a power is not sufficiently stored in the DC link 20. The power supply problem of the battery power P4 may occur when the battery 45 is over-discharged.

In an auxiliary power generating operation S2, the auxiliary power generator 70 of FIG. 2 generates and outputs an auxiliary power.

For example, if the energy storage system 100 starts in the auxiliary power requirements generating operation S1, the auxiliary power generator 70 selects the power having the highest level from the power system power P1, the new renewable energy power P2, the DC link power P3, and the battery power P4, using the diode OR circuit unit 72 and generates an auxiliary power in the auxiliary power generating operation S2. Here, when the energy storage system 100 starts, since there is no stored power, the DC link power P3 does not exist. Accordingly, when the energy storage system 100 starts, the auxiliary power is selected from the power system power P1, the new renewable energy power P2, or the battery power P4. However, after a predetermined time elapses from the starting of the energy storage system 100, when the energy storage system 100 starts normally, the DC link power P3 becomes the highest level power, such that the auxiliary power supplied to the integrated controller 60 becomes the DC link power P3. Here, the DC link 20 charges at least one of the power system power P1, the new renewable energy power P2, and the battery power P4 through the DC link power P3.

For another example, when power supply problems occur in one or two of the power system power P1, the new renewable energy power P2, and the battery power P4 in the auxiliary power requirements generating operation S1, the auxiliary power generator 70 selects the highest power from the power system power P1, the new renewable energy power P2, the DC link power P3, and the battery power P4 using the diode OR circuit unit 72 and generates an auxiliary power in the auxiliary power generating operation S2. Here, the one or two having power supply problems among the power system power P1, the new renewable energy power P2, the DC link power P3, and the battery power P4 are not applied to the auxiliary generating unit 70. That is, when power supply problems occur in one or two among the power system power P1, the new renewable energy power P2, the DC link power P3, and the battery power P4, the auxiliary power generator 70 uses the power source except for one or two of the power sources having the power supply problems from amongst the power system power P1, the new renewable energy power P2, the DC link power P3, and the battery power P4, in order to generate an auxiliary power.

In an auxiliary power supplying operation S3, the auxiliary power generator 70 supplies the auxiliary power to the integrated controller 60 in order to drive it.

As mentioned above, the energy storage system 100 according to one embodiment of the present invention includes the auxiliary power generator 70 with the diode OR circuit unit 72, such that one of the power system power P1, the new renewable energy power P2, the DC link power P3, and the battery power P4 is selected without conflicts and power from such source becomes an auxiliary power.

Accordingly, the energy storage system 100 supplies an auxiliary power to the integrated controller 60 during the starting of the energy storage system 100, and thus can stably drive the integrated controller 60. Additionally, when power supply problems occur in one or two among the power system power P1, the new renewable energy power P2, the DC link power P3, and the battery power P4, the auxiliary power generator 70 supplies an auxiliary power (which is generated using one of the power supplies except for the one or two power supplies having power supply problems) into the integrated controller 60, such that the integrated controller 60 can be continuously driven.

Accordingly, the energy storage system 100 can maintain a stable drive continuously and furthermore, can reduce costs for a storage battery that is additionally required for generating an auxiliary power.

The energy storage system according to embodiments of the present invention is equipped with an auxiliary power generator with a diode OR circuit unit. Therefore, one of a power system voltage, a new renewable energy power, a DC link power, and a battery power can be selected and generated as an auxiliary power. Accordingly, the energy storage system can continuously maintain a stable operation using an auxiliary power generated from an auxiliary power generator and also, can reduce costs for a storage battery that is additionally required for generating an auxiliary power.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An energy storage system comprising:
   a new renewable energy unit to generate a new renewable energy power;
   a Direct Current (DC) link connected to the new renewable energy unit to generate a DC link power;
   a power system connected to the DC link to generate a power system power;
   a battery connected to the DC link to generate a battery power;
   an auxiliary power generator, connected to the power system, the new renewable energy unit, the DC link, and the battery, and configured to generate an auxiliary power; and
   an integrated controller connected to the auxiliary power generator to receive the auxiliary power,
   wherein the auxiliary power generator is configured to select one of the power system power, the new renewable energy power, the DC link power, and the battery power to output the auxiliary power,
   wherein the auxiliary power generator comprises:
      an AC-DC converter to invert the power system power into a DC power; and
      a diode OR circuit unit comprising a first diode to which the inverted power system power is applied, a second diode to which the new renewable energy power is applied, a third diode to which the DC link power is applied, and a fourth diode to which the battery power is applied,
   wherein the diode OR circuit unit is configured to output one of the inverted power system power, the new renewable energy power, the DC link power, and the battery power, having a highest power level as the auxiliary power,
   wherein the auxiliary power generator is directly connected to the power system, the new renewable energy unit, the DC link and the battery through the first diode, the second diode, the third diode, and the fourth diode, respectively, and
   wherein the auxiliary power generator is configured to continuously supply the auxiliary power to the integrated controller so that the integrated controller can continuously maintain an operation.

2. The energy storage system as claimed in claim 1, wherein the auxiliary power generator selects one of the power system power, the new renewable energy power, the DC link power, and the battery power, having a highest power level.

3. The energy storage system as claimed in claim 1, wherein the DC link power is generated by storing in the DC link at least one of the power system power, the new renewable energy power, and the battery power.

4. The energy storage system as claimed in claim 1, wherein the auxiliary power generator operates when the energy storage system initiates operation.

5. The energy storage system as claimed in claim 4, wherein the auxiliary power is selected from the power system power, the new renewable energy power, and the battery power having a highest power level.

6. The energy storage system as claimed in claim 4, wherein when the energy storage system is started, the auxiliary power is the DC link power.

7. The energy storage system as claimed in claim 1, wherein when a problem occurs in generation of at least one of the power system power, the new renewable energy power, the DC link power, and the battery power, the auxiliary power generator begins to operate.

8. The energy storage system as claimed in claim 7, wherein the auxiliary power is selected from one of the power system power, the new renewable energy power, the DC link power, and the battery power.

9. The auxiliary power generator as claimed in claim 1, further comprising a capacitor, the capacitor being connected between the diode OR circuit unit and the integrated controller and configured to remove noise or ripple from the auxiliary power outputted from the diode OR circuit unit.

10. The auxiliary power generator as claimed in claim 1, further comprising an auxiliary power converter, the auxiliary power converter being connected between the diode OR circuit unit and the integrated controller and configured to convert the auxiliary power outputted from the diode OR circuit unit into a DC power.

11. The energy storage system as claimed in claim 1, further comprising:
    a bi-directional inverter connected between the DC link and the power system;
    a load connected between the bi-directional inverter and the power system; and
    a bi-directional converter connected to the DC link and the battery.

12. The energy storage system as claimed in claim 11, further comprising:
    a maximum power point tracker connected between the new renewable energy unit and the DC link;
    a system linker connected between the bi-directional inverter, the load, and the power system; and
    a Battery Management System (BMS) connected to the battery.

13. The energy storage system as claimed in claim 12, wherein the integrated controller controls and monitors the maximum power point tracker, the bi-directional inverter, the system linker, and the BMS.

14. The energy storage system as claimed in claim 1, wherein the new renewable energy unit is a solar battery.

* * * * *